March 10, 1964  M. R. SCHROEDER  3,124,745
SYSTEM FOR DETERMINING MOMENTS OF POWER SPECTRA
Filed March 2, 1960  3 Sheets-Sheet 1

INVENTOR
M. R. SCHROEDER
BY A. E. Hirsch Jr.
ATTORNEY

March 10, 1964    M. R. SCHROEDER    3,124,745
SYSTEM FOR DETERMINING MOMENTS OF POWER SPECTRA
Filed March 2, 1960    3 Sheets-Sheet 2

INVENTOR
M. R. SCHROEDER
BY
G. E. Huschke Jr.
ATTORNEY

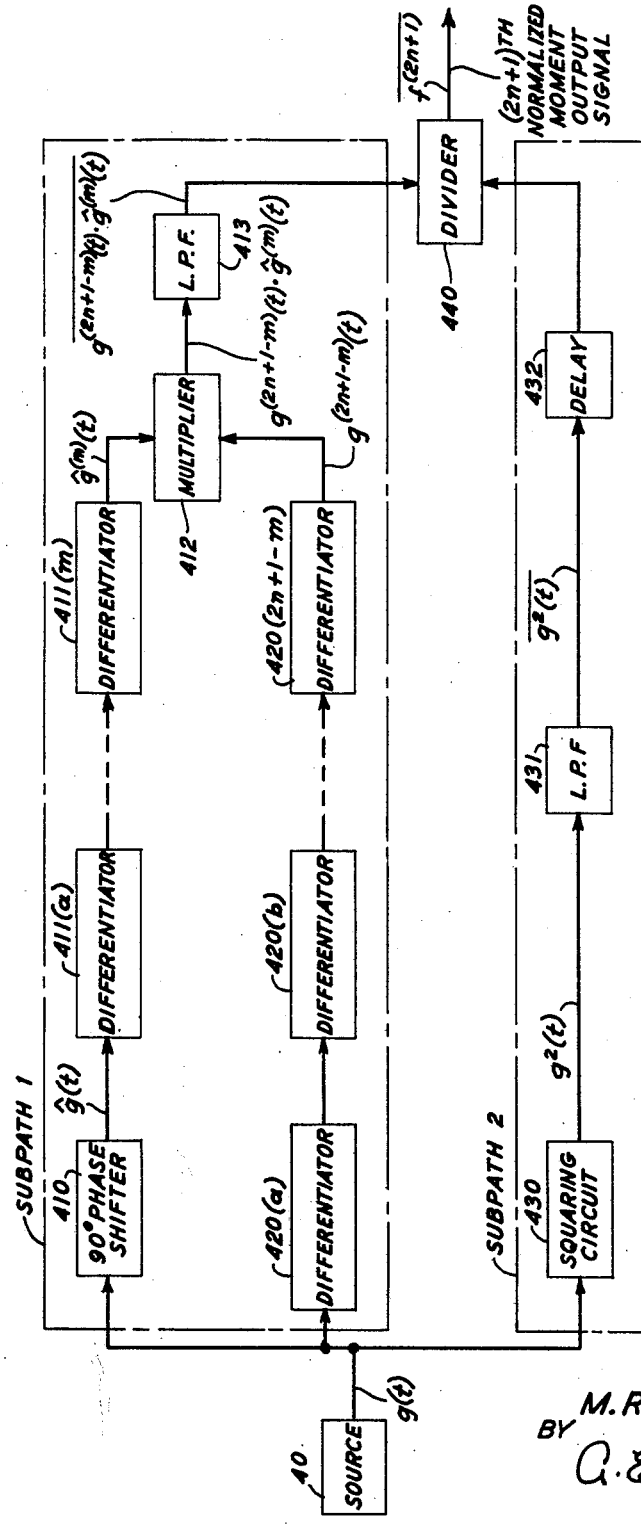

United States Patent Office 3,124,745
Patented Mar. 10, 1964

3,124,745
SYSTEM FOR DETERMINING MOMENTS OF POWER SPECTRA
Manfred R. Schroeder, Gillette, N.J., assignor to Bell Telephone Laboratories, Incorporated, New York, N.Y., a corporation of New York
Filed Mar. 2, 1960, Ser. No. 12,331
10 Claims. (Cl. 324—77)

This invention relates to communication systems, and particularly to a method and means for determining spectral properties of the signals transmitted by such systems.

One of the most important properties of a signal is its power spectrum. The power spectrum represents the statistical distribution of signal energy as a function of frequency, and the so-called "moments" of the power spectrum reveal the detailed structure of the energy distribution. The first moment, for example, represents the mean frequency about which the energy of the signal is distributed, and the second moment represents the mean square frequency of the energy distribution. Further, the second moment about the first moment, or variance, provides an indication as to the shape of the power spectrum since the square root of the variance is a measure of the width of the power spectrum.

The most significant moments of the power spectrum of a signal are the first moment and the second moment about the first moment. In this application these moments are normalized, and in normalized form they shall be referred to alternatively as the mean frequency and the square of the width factor, respectively.

It is a specific object of this invention to determine with precision the mean frequency and the square of the width factor of communication signals.

Moments as a class are defined in terms of functions of frequency, and direct evaluation of moments in the frequency domain requires complex and expensive apparatus. The present invention, however, provides economical, easily instrumented time domain operations for the determination of moments.

It is a further object of this invention to obtain the mean frequency and the square of width factor of signals by time domain operations.

A prior system for determining the mean frequency of the power spectra of certain speech signals is described in M. R. Schroeder Patent 2,857,465, issued October 21, 1958. Although the Schroeder system operates in the time domain to determine the mean frequency, its accuracy is limited both by the width of the frequency range of the power spectrum, the width introducing an error factor that is small only for narrow frequency ranges, and by the special characteristics of the signals to which the invention is applicable, namely, an amplitude distribution not substantially affected by differentiation, and the absence of a steady component. The present invention, on the other hand, determines without error the mean frequency of signals having arbitrary amplitude distributions and wide-band power spectra.

It is a specific object of the present invention to determine with accuracy the mean frequency and the square of the width factor of signals having arbitrary amplitude distributions and wide-band power spectra.

In the present invention, the mean frequency of a signal is obtained in the time domain by simultaneously applying the signal as a function of time to two parallel circuits, one of which derives the Hilbert transform or quadrature function of the signal, and the second of which derives the first derivative of the signal. The Hilbert transform and the first derivative thus derived are multiplied together and time averaged to produce the first moment of the power spectrum. In this invention, all moments are normalized by dividing them by the total power of the signal, which is obtained in the time domain by averaging the square of the original waveform as a function of time. Thus the mean frequency is obtained by normalizing the time domain version of the first moment with the time domain version of the total power.

In order to obtain the square of the width factor or normalized second moment about the first moment, it is necessary to obtain the mean square frequency of the power spectrum, since the square of the width factor is equal to the mean square frequency less the square of the mean frequency. A time domain expression for the mean square frequency or normalized second moment is given in the Schroeder patent referred to above, and together with the time domain expression for the mean frequency derived in this invention, the square of the width factor is obtained by subtracting the square of the mean frequency from the mean square frequency.

In addition, the derivation of higher order odd moments by easily instrumented time domain operations is attained by this invention.

The invention will be fully apprehended from the following descriptions of illustrative embodiments thereof, taken in connection with the appended drawings, in which:

FIG. 4 is a block schematic diagram showing apparatus alternative to that of FIG. 3.

Figure 1:
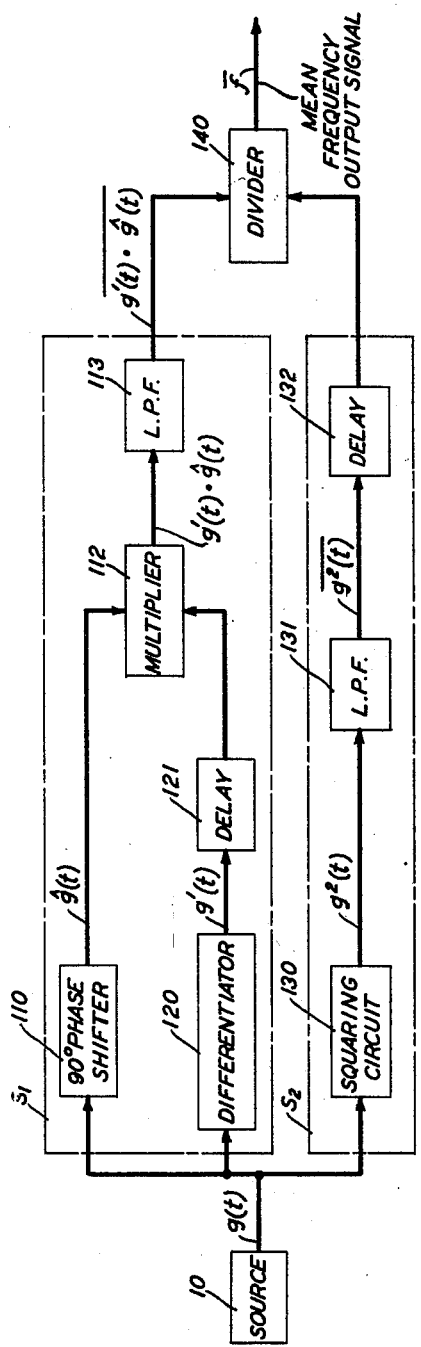
FIG. 1 is a block schematic diagram showing apparatus for obtaining the mean frequency of a signal.

Before describing the invention in detail, it is desirable to establish the mathematical basis of the principles embodied in the invention.

*Mathematical Analysis*

For a signal that is a physically realizable, nonvanishing function $g$ of a real variable $t$, having an arbitrary amplitude spectrum, $G(f)$, the Fourier theorem provides the relation between the signal and its amplitude spectrum, $$G(f) = \int_{-\infty}^{\infty} g(t) e^{-2\pi i f t} dt \qquad (1)$$

$$g(t) = \int_{-\infty}^{\infty} G(f) e^{2\pi i f t} df \qquad (2)$$

where $f$ is frequency in cycles per second, and the power spectrum of $g(t)$ is $|G(f)|^2$.

In the present invention, the mean frequency, $\bar{f}$, of the signal, $g(t)$, is defined as the normalized first moment of the power spectrum of the signal, $$\bar{f} = \frac{\int_{0}^{\infty} f |G(f)|^2 df}{\int_{0}^{\infty} |G(f)|^2 df} \qquad (3)$$

where the numerator of (3) is the first moment of the power spectrum and the denominator is the total power of the signal.

In order to determine the exact value of $\bar{f}$ by time domain operations, it is necessary to define the Hilbert transform $\hat{g}(t)$, of $g(t)$, $$\hat{g}(t) \equiv \frac{1}{\pi} \int_{-\infty}^{\infty} \frac{g(\tau)}{\tau - t} d\tau, \qquad (4)$$

where $\hat{g}(t)$ has the same amplitude spectrum as $g(t)$, except as $f = 0$, but the two spectra differ in phase by 90°, that is, the amplitude spectrum of the Hilbert transform is $$\hat{G}(f) = \begin{cases} iG(f) & \text{for } f>0 \\ 0 & \text{for } f=0 \\ -iG(f) & \text{for } f<0 \end{cases} \quad (5)$$

The first derivative of the signal as a function of time is $g'(t)$, and its amplitude spectrum is $$2\pi i f \cdot G(f) \quad (6)$$

The following time averages are defined:

$$\overline{g^2(t)} \equiv \int_{-\infty}^{\infty} g^2(t) dt, \quad (7)$$

and $$\overline{g'(t) \cdot \hat{g}(t)} \equiv \int_{-\infty}^{\infty} g'(t) \cdot \hat{g}(t) dt. \quad (8)$$

Applying Parseval's theorem to definition (7), $$\overline{g^2(t)} = \int_{-\infty}^{\infty} G(f) \cdot G^*(f) df = \int_{-\infty}^{\infty} |G(f)|^2 df$$

$$= 2 \int_0^{\infty} |G(f)|^2 df \quad (9)$$

where the star * denotes complex conjugate. Substituting (5) and (6) in (8), and applying Parseval's theorem, $$\overline{g'(t) \cdot \hat{g}(t)} = \int_{-\infty}^{\infty} 2\pi i f \cdot G(f) \cdot \hat{G}^*(f) df \quad (10)$$

where $$\hat{G}^*(f) = \begin{cases} -i \cdot G^*(f) & \text{for } f>0 \\ 0 & \text{for } f=0 \\ i \cdot G^*(f) & \text{for } f<0 \end{cases} \quad (11)$$

substituting (11) into (10) and splitting the limits of integration, $$\overline{g'(t) \cdot \hat{g}(t)} = -\int_{-\infty}^{0} 2\pi f |G(f)|^2 df + \int_{0}^{\infty} 2\pi f \cdot |G(f)|^2 df \quad (12)$$

By making the useful substitution $f = -x$ in the first term of (12), $$\overline{g'(t) \cdot \hat{g}(t)} = 4\pi \int_0^{\infty} f \cdot |G(f)|^2 df. \quad (13)$$

Substituting (9) and (13) in (3), the definition of the mean frequency, $$\bar{f} \equiv \frac{\int_0^{\infty} f \cdot |G(f)|^2 df}{\int_0^{\infty} |G(f)|^2 df} = \frac{1}{2\pi} \cdot \frac{\overline{g'(t) \cdot \hat{g}(t)}}{\overline{g^2(t)}} \quad (14)$$

That is, the mean frequency of a physically realizable signal with an arbitrary amplitude spectrum is expressible in terms of time functions by taking the ratio of the time average of the product of the first derivative of the signal and the Hilbert transform of the signal to the time average of the square of the original signal. Hence the mean frequency can be obtained with precision in the time domain by (a) differentiating the signal; (b) obtaining the Hilbert transform of the signal; (c) multiplying the derivative and the Hilbert transform together; (d) averaging the product (c); (e) squaring the original signal; (f) averaging the square (e); and, (g) dividing (d) by (f).

The time domain representations derived for the normalized first moment may be generalized to include any normalized odd moment. If the general frequency domain definition of any normalized odd moment is $$\overline{f^{2n+1}} \equiv \frac{\int_0^{\infty} f^{2n+1} \cdot |G(f)|^2 df}{\int_0^{\infty} |G(f)|^2 df}, \quad n=0, 1, 2, 3, \ldots \quad (15)$$

then by the application of the Fourier theorem, Parseval's theorem and Hilbert transforms, the general time domain expression for any $(2n+1)$th normalized odd moment is $$\overline{f^{2n+1}} = \frac{(-1)^n}{(2\pi)^{2n+1}} \cdot \frac{\overline{g^{(2n+1)}(t) \cdot \hat{g}(t)}}{\overline{g^2(t)}}, \quad n=0, 1, 2, 3, \ldots \quad (16)$$

where $g^{(2n+1)}(t)$ is the $(2n+1)$th derivative of $g(t)$. Equation 16 can be reduced by $m$ integrations by parts, $m \leq (2n+1)$, to $$\overline{f^{2n+1}} = \frac{(-1)^{n+m}}{(2\pi)^{2n+1}} \cdot \frac{\overline{g^{(2n+1-m)}(t) \cdot \hat{g}^{(m)}(t)}}{\overline{g^2(t)}}, \quad \begin{array}{l} n=0, 1, 2, 3, \ldots \\ m=0, 1, \ldots, 2n+1 \end{array} \quad (17)$$

where $\hat{g}^{(m)}(t)$ is the $m$th derivative of the Hilbert transform of $g(t)$.

The square of the width factor, $\overline{\Delta f^2}$, of a signal, $g(t)$, with an arbitrary amplitude spectrum, $G(f)$, is defined as the normalized second moment about the first moment of the power spectrum, $|G(f)|^2$ of $g(t)$, that is, $$\overline{\Delta f^2} \equiv \frac{\int_0^{\infty} (f - \bar{f})^2 |G(f)|^2 df}{\int_0^{\infty} |G(f)|^2 df} \quad (18)$$

From the aforementioned Schroeder patent, the normalized second moment $\overline{f^2}$ is expressible as the following time function:

$$\overline{f^2} \equiv \frac{\int_0^{\infty} f^2 |G(f)|^2 df}{\int_0^{\infty} |G(f)|^2 df} = \frac{1}{4\pi^2} \cdot \frac{\overline{g'^2(t)}}{\overline{g^2(t)}} \quad (19)$$

Applying definitions (3) and (19) to Equation 18, we have the well-known result, $$\overline{\Delta f^2} = \overline{f^2} - (\bar{f})^2 \quad (20)$$

Hence the square of the width factor of a signal is equal to the normalized second moment less the square of the normalized first moment. Since both terms on the right-hand side of Equation 20 are expressible in terms of time functions (14) and (19), the square of the width factor itself is expressible as a time function.

*Apparatus*

Figure 2:
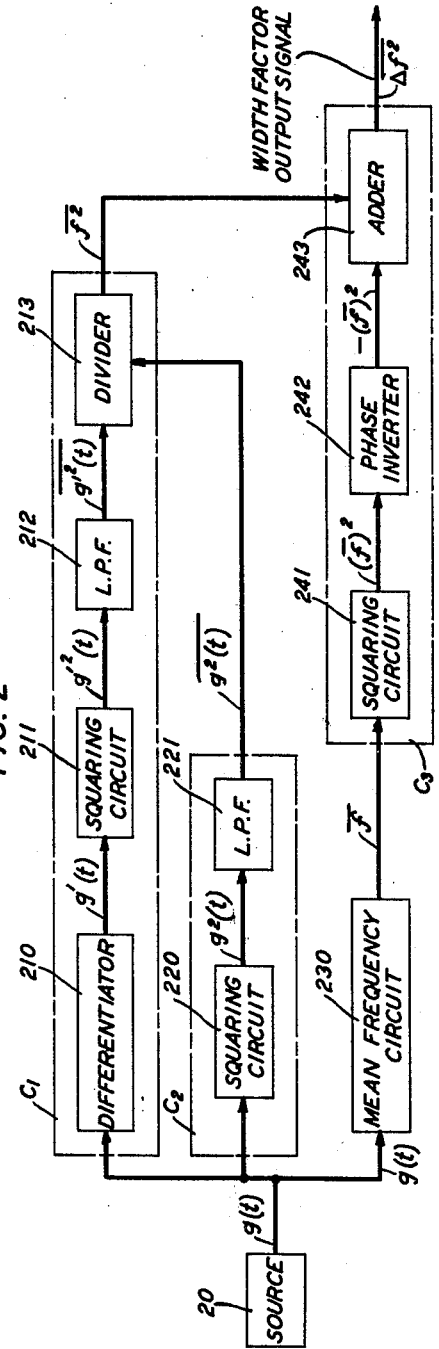
FIG. 2 is a block schematic diagram showing apparatus for obtaining the square of the width factor of a signal.

Apparatus for deriving spectral moments in accordance with the above analysis is illustrated in the preferred embodiments of the invention in FIGS. 1 and 2.

Referring to FIG. 1, there is shown a preferred circuit for determining the normalized first moment of a signal with an arbitrary amplitude spectrum and a wide-band power spectrum. A signal, $g(t)$, for example, an electrical wave, is generated by source 10, which for the purpose of illustration may be a transducer of any suitable variety. The waveform is applied to two parallel subpaths, $S_1$ and $S_2$. The upper subpath $S_1$ consists of circuit elements that operate in the time domain to derive a signal proportional to the first moment of the power spectrum of $g(t)$, that is, a signal proportional to the value of the numerator of Equation 14, $\overline{g'(t) \cdot \hat{g}(t)}$. The lower subpath $S_2$ consists of circuit elements that operate in the time domain to derive a signal proportional to the total power, that is, a signal proportional to the value of the denominator of Equation 14, $\overline{g^2(t)}$. The output terminals of both subpaths are connected to divider 140, which forms the mean frequency or normalized first moment by taking the ratio of the "numerator" signal from subpath $S_1$ to the "denominator" signal from subpath $S_2$.

In the upper subpath $S_1$, the signal from source 10 is applied simultaneously to 90° phase shifter 110 and to differentiator 120, in order to obtain the Hilbert transform and the first derivative of $g(t)$, respectively. Both 90° phase shifter 110 and differentiator 120 are of well-known construction, but the operation of element 110 in producing the Hilbert transform of $g(t)$ is deserving of further explanation.

The use of 90° phase shifter 110 to obtain the Hilbert transform of $g(t)$ is based upon the well-known quadrature relationship between a function and its Hilbert transform. A proof of this relationship is found in S. Goldman, Information Theory, page 332, (1953). Since functions that are in quadrature with each other differ solely in phase by 90°, element 110 may be one of several equally suitable 90° phase shifting devices for obtaining the Hilbert transform or quadrature function of $g(t)$; for example, a transversal filter of the type described in Patent 2,451,465 issued to H. L. Barney on October 19, 1948, or a wide-band phase splitter of the type described in Patent 2,727,141 issued to R. C. Cheek on December 13, 1955. In addition, an all-pass filter network for obtaining the Hilbert transform of a real waveform is found in applicant's copending patent application Serial No. 827,814, filed July 17, 1959.

The Hilbert transform output of phase shifter 110 is applied to one input terminal of multiplier 112, while the first derivative output of differentiator 120 is applied to the other input terminal of multiplier 112. The first derivative signal, however, may, if necessary, be passed through delay element 121 in order to compensate for the delay produced by phase shifter 110. Multiplier 112, which may be of any suitable variety, develops from these input signals the product $g'(t) \cdot \hat{g}(t)$, which is passed to low-pass filter 113 to form the time average of the product. The time constant of filter 113 is adjusted so that the signal developed at its output terminal is proportional to the first moment of the power spectrum of $g(t)$. The time constant, in turn, depends upon the nature of the signal whose mean frequency is being determined; for example, if the signal is speech, then a time constant of 30 milliseconds will suffice. This first moment signal is then normalized to form the mean frequency by connecting the output terminal of filter 113 to divider 140 in a manner such that the divider, which is of any well-known construction, obtains the quotient of the first moment from filter 113 divided by the total power from subpath $S_2$.

The time domain derivation of the total power, corresponding to the operations specified in the denominator of Equation 14, is performed in subpath $S_2$. The original signal as a function of time is applied to squaring circuit 130, which may be of any well-known variety, in order to obtain the second power of the signal, $g^2(t)$. The time average of $g^2(t)$ is then formed by low-pass filter 131, whose time constant is adjusted so as to develop at its output terminal a signal proportional to the denominator of Equation 14. The time constant of filter 131 depends upon the properties of the signal whose moments are being determined; in the case of speech, for example, the time constant is on the order of 30 milliseconds. The output of filter 131 may be passed through delay element 132, if desired, to compensate for the delay produced by phase shifter 110 in subpath $S_1$. The delayed signal representing the total power is then applied to the divisor terminal of divider 140, and together with the first moment signal from filter 113 applied to the dividend terminal of divider 140, there is produced at the quotient terminal of divider 140 a signal proportional to the normalized first moment or mean frequency, $\bar{f}$.

Figure 3:
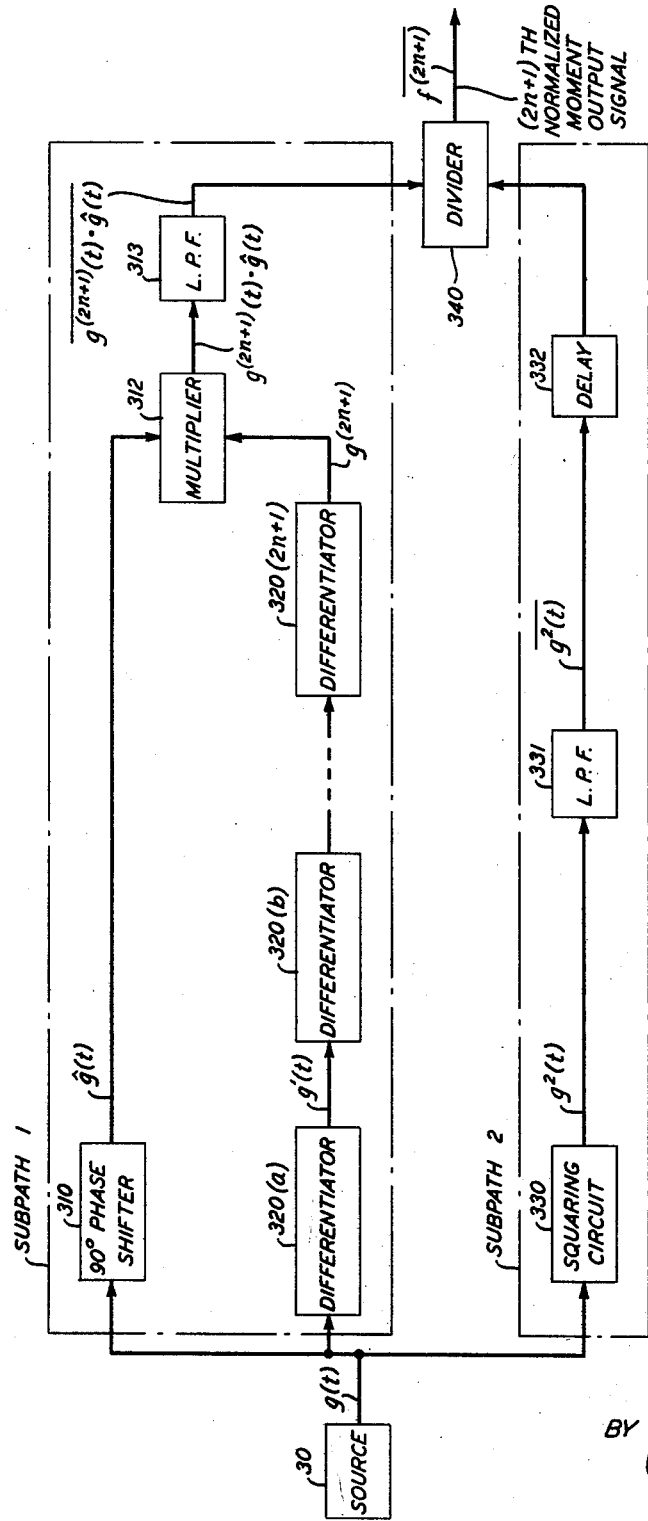
FIG. 3 is a block schematic diagram showing apparatus for obtaining any odd-order normalized moment of a signal.

Modification of the apparatus of FIG. 1 in order to determine any odd-order normalized moment is readily apparent from Equations 16 and 17. Implementation of Equation 16, for example, is illustrated by FIG. 3 and requires $2n+1$ differentiators 320$(a)$, 320$(b)$, ..., 320$(2n+1)$ in order to produce the $(2n+1)$th normalized moment of $g(t)$ for $n=0, 1, 2, 3, \ldots$. Modification of the apparatus of FIG. 1 in order to determine any odd-order normalized moment in accordance with Equation 17 is equally apparent, as illustrated by FIG. 4. In subpath 1 of FIG. 4, 90° phase shifter 410 is followed by $m$ differentiators 411$(a)$ through 411$(m)$ in series to derive from the incoming signals $g(t)$ the $m$th differentiated Hilbert transform signal $\hat{g}^{(m)}(t)$; and in parallel with 90° phase shifter 410, there are $(2n+1-m)$ differentiators 420$(a)$ through 420$(2n+1-m)$ in series to derive from the incoming signal $g(t)$ the $(2n+1-m)$th differentiated signal $g^{(2n+1-m)}(t)$.

FIG. 2 illustrates another form of the invention in which the normalized second moment about the first moment is obtained.

A signal, $g(t)$, having an arbitrary amplitude spectrum and a wide-band power spectrum, is generated by source 20 and applied simultaneously to two parallel circuits, $C_1$ and $C_2$. Circuits $C_1$ and $C_2$, which consist of elements that operate in the time domain, work in conjunction to derive the mean square frequency, $\overline{f^2}$, of $g(t)$ in accordance with Equation 19. The mean square frequency output of these circuits is applied to circuit $C_3$, together with a mean frequency signal derived from $g(t)$ by circuit 230, for example, the apparatus of FIG. 1. Circuit $C_3$ processes these signals in accordance with Equation 20 to derive the square of the width factor, $\overline{\Delta f^2}$.

Circuit $C_1$ contains differentiator 210, squaring circuit 211, low-pass filter 212, and divider 213 connected in tandem. These elements are all of well-known construction, and elements 210, 211, and 212 serve to differentiate, square and time average $g(t)$ so as to obtain the time domain version of the second moment, $\overline{g'^2(t)}$. Divider 213 then normalizes the second moment to derive the mean square frequency, $\overline{f^2}$, by forming the quotient of the second moment divided by a signal proportional to the total power of $g(t)$ from circuit $C_2$. Circuit $C_2$, which comprises squaring circuit 220 and low-pass filter 221, operates in exactly the same manner as subpath $S_2$ in FIG. 1 to obtain the time domain version of the total power, $\overline{g^2(t)}$.

The means square frequency output signal of divider 213 is passed to circuit $C_3$, together with a signal from circuit 230 representing the mean frequency, and circuit $C_3$ forms the square of the width factor $\overline{\Delta f^2}$ from these two signals. Within circuit $C_3$, the mean frequency signal is applied to squaring circuit 241 followed by phase inverter 242 to obtain the square of the mean frequency with reversed polarity, $-(\bar{f})^2$. The mean square frequency output signal from divider 213 and the output signal of phase inverter 242 are additively combined in adder 243, which develops at its output terminal a signal proportional to the square of the width factor $\overline{\Delta f^2}$.

It is to be understood that the above-described arrangements are merely illustrative of applications of the principles of the invention. Numerous other arrangements may be devised by those skilled in the art without departing from the spirit and scope of the invention.

What is claimed is:

1. Apparatus for determining normalized odd-order moments of the power spectrum of a complex wave, which comprises means for obtaining the Hilbert transform of said wave by shifting the phase of said wave by 90°, means for differentiating said wave, means for deriving a signal proportional to the product of said differentiated wave and the Hilbert transform of said wave, means for averaging said product signal, means for developing a signal proportional to the power of said wave, and means for dividing said averaged product signal by said power signal.

2. Apparatus as defined in claim 1 wherein said differentiating means comprises the series combination of $(2n+1)$ differentiating circuits for determining the $(2n+1)$th order moment of said wave, where $n=0, 1, 2, 3, \ldots$.

3. Apparatus for developing a signal representative of the mean frequency of the power spectrum of a time-varying wave, $g(t)$, which comprises means for generating from said wave a wave proportional to the first derivative, $g'(t)$, means for shifting the phase of said wave by 90° to generate a wave proportional to the Hilbert transform, $\hat{g}(t)$, and means for generating from said wave a wave proportional to the second power, $(g^2(t))$, means for multiplying together said first derivative wave and said Hilbert transform wave to form the product wave, $g'(t) \cdot \hat{g}(t)$, means for averaging said product wave to form a first average wave $\overline{g'(t) \cdot \hat{g}(t)}$, means for averaging said second power wave to form a second average wave $\overline{g^2(t)}$, and means for dividing said first average wave by said second average wave to form said mean frequency signal.

4. Apparatus as defined in claim 3 wherein said means for generating from said wave a wave proportional to the second power, $g^2(t)$, comprises a squaring circuit.

5. Apparatus as defined in claim 3 wherein said means for averaging said product wave comprises a first low-pass filter, and said means for averaging said second power wave comprises a second low-pass filter.

6. Apparatus for obtaining a signal indicative of the width of the power spectrum of a time-varying complex wave, $g(t)$, which comprises means for developing from said wave a signal proportional to its means square frequency, $\overline{f^2}$, means for developing from said wave a signal proportional to the second power of its mean frequency, $(\bar{f})^2$, means for inverting the phase of said second power mean frequency signal, and means for additively combining said mean square frequency signal and said phase-inverted signal to form said width-indicating signal.

7. Apparatus as defined in claim 6 wherein said means for developing from said wave a signal proportional to its mean square frequency comprises two parallel energy paths each supplied with said wave, wherein the first of said energy paths comprises the series combination of a differentiating circuit, a squaring circuit and a low-pass filter, and the second of said energy paths comprises the series combination of a squaring circuit and a low-pass filter, dividing means whose dividend terminal is connected to the output terminal of the first of said energy paths, and whose divisor terminal is connected to the output terminal of the second of said energy paths, whereby said dividing means develops at its quotient terminal a signal proportional to the mean square frequency of said wave.

8. Apparatus for determining spectral moments of a complex wave, which comprises a first means for developing a signal proportional to the normalized first moment of the power spectrum of said wave, said first means including means for generating from said wave a signal proportional to the first derivative of said wave, means for shifting the phase of said wave by 90° to obtain a signal proportional to the Hilbert transform of said wave, and means for generating from said wave a signal proportional to the second power of said wave, means for multiplying together said first derivative signal and said Hilbert transform signal to obtain a product output signal, means for averaging the product output signal of said multiplying means to form a signal proportional to the first moment of the power spectrum of said wave, means for averaging the second power of said wave to form a signal proportional to the total power of said wave, and means for dividing said first moment signal by said total power signal to form a signal proportional to the normalized first moment of the power spectrum of said wave, a second means for developing a signal proportional to the normalized second moment of the power spectrum of said wave, said second means including means for generating from said wave a signal proportional to the first derivative of said wave, means for raising said first derivative signal to the second power, means for averaging the second power of said first derivative signal to form a signal proportional to the second moment of the power spectrum of said wave, and means for normalizing said second moment signal by dividing it by said signal proportional to the total power of said wave, and a third means for developing a signal proportional to the normalized second moment about the first moment of said wave, said third means including means for generating from the output signal of said first means a signal proportional to the second power of the normalized first moment, means for inverting the phase of said second power normalized first moment signal, and means connected to the output terminals of said second means and said phase-inverting means for additively combining said normalized second moment signal and said phase-inverted signal.

9. Apparatus for deriving from a complex wave a signal representative of the normalized first moment of the power spectrum of said wave, which comprises means for shifting the phase of said wave by 90°, means connected in parallel with said phase-shifting means for differentiating said wave, means for time synchronizing said differentiated wave with said phase-shifted wave, means for multiplying together said phase-shifted wave and said synchronized differentiated wave, means for averaging the product of said phase-shifted wave and said synchronized differentiated wave to form a signal proportional to the first moment of said wave, means for normalizing said first moment signal, said normalizing means including means for raising said original wave to the second power, means for averaging the second power of said original wave to form a signal proportional to the total power of said wave, means for synchronizing said total power signal with said first moment signal, and means for dividing said first moment signal by said total power signal.

10. Apparatus for determining the normalized $(2n+1)$th moment of the power spectrum of a complex wave, $n=0, 1, 2, \ldots$, which comprises means for shifting the phase of said complex wave by 90° to obtain a Hilbert transform signal proportional to the Hilbert transform of said complex wave, means for successively differentiating said Hilbert transform signal $m$ times, $m \leq (2n+1)$, $m = 0, 1, 2, \ldots, 2n+1$, to derive a signal representative of the $m$th derivative of the Hilbert transform of said complex wave, means for successively differentiating said complex wave $(2n+1-m)$ times to obtain a signal indicative of the $(2n+1-m)$th derivative of said complex wave, means for deriving from said complex wave a signal proportional to the power of said complex wave, means for multiplying together the signal representative of the $m$th derivative of the Hilbert transform of said complex wave and the signal indicative of the $m$th derivative of said complex wave to obtain a product signal, means for averaging said product signal, and means for dividing said averaged product signal by said power signal.

References Cited in the file of this patent
UNITED STATES PATENTS

| | | |
|---|---|---|
| 2,253,975 | Guanella | Aug. 26, 1941 |
| 2,480,128 | Frum | Aug. 30, 1949 |
| 2,511,564 | Callan | June 13, 1950 |
| 2,537,589 | Johnson | Jan. 9, 1951 |
| 2,791,751 | Fine et al. | May 7, 1957 |
| 2,799,734 | Camp | July 16, 1957 |
| 2,857,465 | Schroeder | Oct. 21, 1958 |
| 2,895,111 | Rothe | July 14, 1959 |
| 2,918,581 | Willey et al. | Dec. 22, 1959 |
| 3,035,231 | Neelands et al. | May 15, 1962 |